(12) United States Patent
Li et al.

(10) Patent No.: US 7,394,621 B2
(45) Date of Patent: Jul. 1, 2008

(54) USING BILAYER LITHOGRAPHY PROCESS TO DEFINE NECK HEIGHT FOR PMR

(75) Inventors: Donghong Li, Fremont, CA (US); Yoshitaka Sasaki, Santa Clara, CA (US)

(73) Assignee: Headway Technologies, Inc., Milpitas, CA (US)

( * ) Notice: Subject to any disclaimer, the term of this patent is extended or adjusted under 35 U.S.C. 154(b) by 492 days.

(21) Appl. No.: 10/881,444

(22) Filed: Jun. 30, 2004

(65) Prior Publication Data

US 2006/0002021 A1 Jan. 5, 2006

(51) Int. Cl.
*G11B 5/127* (2006.01)

(52) U.S. Cl. .............. 360/125.15; 29/603.01

(58) Field of Classification Search ........... 360/125.06, 360/125.11, 125.15, 125.04
See application file for complete search history.

(56) References Cited

U.S. PATENT DOCUMENTS

| | | | |
|---|---|---|---|
| 4,656,546 A | 4/1987 | Mallory | 360/110 |
| 4,672,493 A | 6/1987 | Schewe | 360/125 |
| 6,430,806 B1 | 8/2002 | Chen et al. | 29/603.07 |
| 6,504,675 B1 | 1/2003 | Shukh et al. | 360/125 |
| 6,612,017 B2 | 9/2003 | Santini | 29/603.12 |
| 6,650,503 B1 | 11/2003 | Chen et al. | 360/126 |
| 6,687,084 B2 | 2/2004 | Takahashi et al. | 360/126 |
| 6,693,768 B1 | 2/2004 | Crue et al. | 360/126 |
| 2004/0228033 A1* | 11/2004 | Aoki et al. | 360/126 |

* cited by examiner

*Primary Examiner*—David D Davis
(74) *Attorney, Agent, or Firm*—Saile Ackerman LLC; Stephen B. Ackerman

(57) ABSTRACT

A method for independently forming neck height (NH) and pole width dimensions in a main pole layer of a PMR write head is described. A main pole layer with a pole tip region is formed on a bottom yoke. The pole tip region is trimmed by an ion milling process to give a pole width. A bilayer resist is patterned to form an opening with an undercut on the main pole layer. The opening uncovers the pole tip region except for an NH length adjacent to the pole tip. A top yoke comprised of CoFeN with a thickness of about 0.2 microns is deposited in the opening and the bilayer resist is removed by a lift-off process. Thereafter, a write gap layer is formed on the pole tip region and then first, second, and third write shield layers are formed above the write gap layer along the ABS.

37 Claims, 6 Drawing Sheets

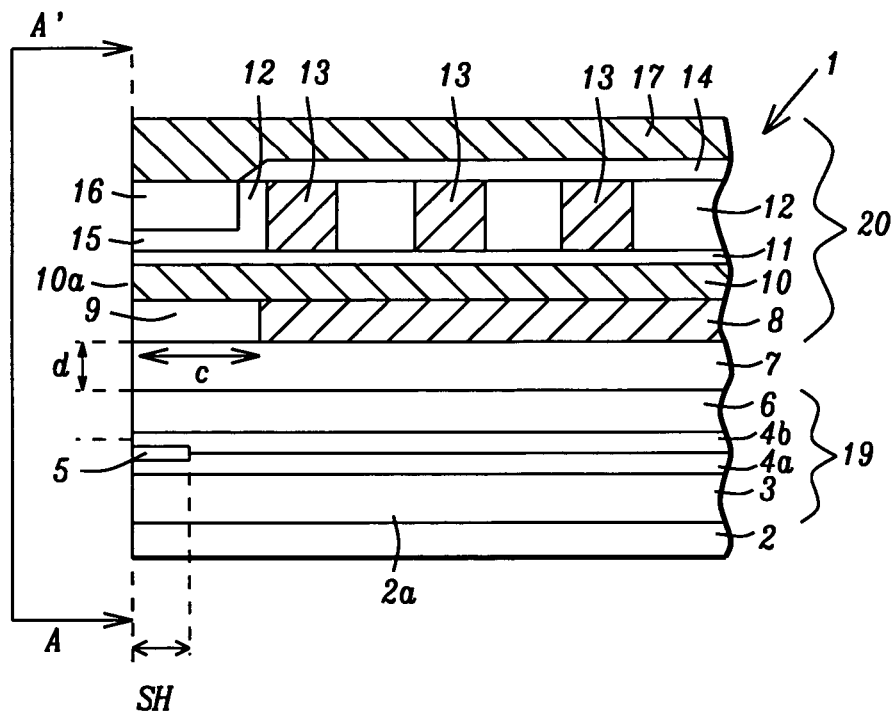
FIG. 1 - Prior Art
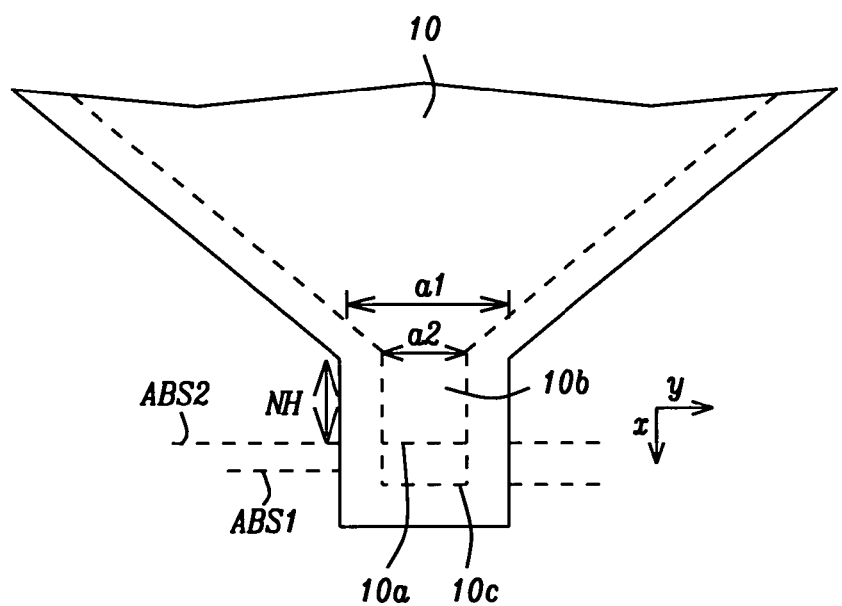
FIG. 2 - Prior Art

USING BILAYER LITHOGRAPHY PROCESS TO DEFINE NECK HEIGHT FOR PMR

FIELD OF THE INVENTION

The invention relates to a perpendicular magnetic recording head (PMR) and a method for making the same. In particular, a method is described for forming a tapered top yoke on a main pole that enables neck height and pole width to be independently controlled.

BACKGROUND OF THE INVENTION

Perpendicular recording has been developed in part to achieve higher recording density than is realized with longitudinal recording devices. A PMR writer typically has a main pole with a small surface area at an air bearing surface (ABS) and a return flux pole or opposing pole with a large surface area (at the ABS) which is magnetically coupled to the main pole. Critical dimensions of the main pole include a neck height (NH) and a pole width in a pole tip region adjacent to the ABS. After depositing and planarizing the main pole, an ion milling process is typically used to trim excess magnetic material at its edges. Since the pole tip region has small dimensions, the ion milling step generally produces a large variation in NH. Moreover, a small NH leads to a large variation in pole width which is also referred to as track width.

A conventional PMR head 1 with a merged read/write head structure is depicted in FIG. 1. The read head 19 is formed on a substrate 2 that has a top surface 2a. There is a first shield 3 formed on the substrate 2 and first and second gap layers 4a, 4b consecutively formed on the first shield. Between the first and second gap layers 4a, 4b at the ABS A-A' is a sensor 5 with a stripe height SH. A second shield 6 forms the top of the read head. The read head is separated by a distance d from the write head 20 with a separation layer 7 such as $Al_2O_3$.

The bottom layer in the write head 20 is a bottom yoke 8 which can be recessed from the ABS A-A' by a distance c which is typically about 1 micron. Adjacent to the bottom yoke 8 on the separation layer 7 is formed an insulator layer 9 that extends from the ABS toward the back side of the write head. A main pole layer 10 on the insulator layer 9 and bottom yoke 8 has a pole tip 10a in a pole tip region (FIG. 2) at the ABS. There is a write gap layer 11 on the main pole layer 10 and a second insulation layer 12 on the write gap layer. The write gap layer extends toward a back end of the write head but is interrupted by a back gap region (not shown). A plurality of coils 13 located within the second insulation layer 12 is wrapped around the back gap region where the main pole layer 10 joins a third write shield 17. An overcoat dielectric layer 14 such as alumina typically covers the coils 13 to separate the coils from the third write shield 17. There is a first write shield 15 on the main pole layer 10 along the ABS and a second write shield 16 between the first write shield and the third write shield 17.

Referring to FIG. 2, a top view of a portion of the main pole layer 10 is pictured with surrounding layers removed. The main pole layer 10 with a pole tip region 10b is formed in a write head on a slider that is part of an array of sliders on a wafer. An ion milling process is typically employed to reduce an initial pole width a1 in each main pole layer to a2 and also trim the edges of the main pole layer 10 by a similar dimension along the dashed lines. Thus, the length of the pole tip region along the x-axis is reduced by a distance of about 0.5×(a1-a2) and a pole tip 10c is formed after the ion milling step. Note that the corners where the pole tip region 10b meets the main pole layer 10 are shown as well defined points for the purpose of this discussion. Typically, the intersection of the pole tip region and main pole layer has a rounded shape before and after the ion milling process and the distances a1 and a2 may be difficult to measure. Once the write head is fabricated, the wafer is sliced to form rows of sliders along an initial lapping plane ABS1.

A subsequent lapping process forms a final ABS2 lapping plane that defines a pole tip 10a in the pole tip region 10b with a neck height NH. However, there are large variations in the NH dimension, largely due to variations in the ion milling process. For example, the distance 0.5×(a1-a2) can sometimes exceed the desired NH dimension and large variations in the location of the pole tip 10c can result. In some cases, the pole tip 10c may be closer to the main pole layer 10 than the desired NH distance and a subsequent lapping process cannot correct the overtrimmed condition. Therefore, a method of fabricating a PMR head is desirable in which the NH dimension is not determined by an ion milling step in order to improve process control. To our knowledge, the prior art does not teach a method for independently forming NH and pole width dimensions.

In U.S. Pat. No. 6,687,084, a yoke layer is formed on a main pole layer in order to improve the passing efficiency of magnetic flux from the main pole layer to a recording medium. The yoke layer is thicker than the main pole layer and both are formed above a coil layer while a return pole is below the coil layer.

A yoke layer with a low magnetic moment is formed on a main pole layer having a high magnetic moment in U.S. Pat. No. 6,693,768. The magnetic flux is channeled into the main pole tip before writing to the recording medium. Again, the yoke layer and main pole layer are above a coil layer and an auxiliary pole is formed below the coils.

An inductive write head including a thin high moment pedestal with a tapered edge is disclosed in U.S. Pat. No. 6,650,503 and a method for forming the same is provided in U.S. Pat. No. 6,430,806. A bilayer resist is patterned on a stack consisting of a high Bsat layer on a soft magnetic first pole layer. The high Bsat layer is etched to give a tapered edge that is determined by an overhang in the bilayer profile. The tapered edge promotes a smooth flux flow through the pole tip region of the first pole.

SUMMARY OF THE INVENTION

One objective of the present invention is to provide a method for forming a neck height dimension in a PMR write head that does not involve ion milling.

A further objective of the present invention is to provide a method for forming a PMR writer in which the pole width and neck height dimensions are defined in separate steps.

A still further objective of the present invention is to provide a PMR write head that has improved dimensional control for neck height and pole width in a main pole tip region.

These objectives are achieved in a first embodiment by providing a substrate on which a PMR write head is to be formed. A bottom yoke is formed on the substrate by a conventional method and is recessed from a first plane that will become an ABS in a subsequent step wherein the first plane is perpendicular to the substrate. A main pole layer is formed on the bottom yoke by a well known sequence involving photoresist patterning to generate an opening, deposition of the main pole layer in the opening, planarization, and photoresist removal. The resulting main pole layer has a smaller pole tip region adjacent to the first plane and a larger back end region. From a top view, the pole tip region has a rectangular shape with a first width and a first length (NH+b) where NH is the intended neck height. One end of the pole tip region is the pole tip at the first plane while the other end is adjacent to a front side of the back end region of the main pole layer. The main pole layer has two sides that flare outward from the front side and two sides that connect the flared sides to a back side that is parallel to the first plane.

The first width of the pole tip region may be trimmed by an ion milling process to produce a pole width dimension which is the intended track width. Next, a first insulation layer such as $Al_2O_3$ is sputter deposited and planarized to become coplanar with the main pole layer. In an important following step, a bilayer photoresist is patterned with an undercut to uncover the main pole layer except for a portion of the pole tip region adjacent to the first plane. The bilayer photoresist is preferably comprised of an upper PFI-88 layer and a lower PMGI layer which covers the pole tip region for a distance NH from the first plane and exposes the remainder of the pole tip region with a length b adjacent to the front side of the back end region. A thin top yoke layer such as CoFeN is deposited on the bilayer resist and in the openings of the bilayer pattern. Because of the undercut bilayer pattern, the top yoke layer has a tapered profile at its edges which include a portion on the pole tip region. The top yoke has a second thickness of about 0.2 microns and the ratio of the second thickness to the first thickness is from about 0.8:1 to 1.2:1. The process of forming the top yoke determines the NH dimension independently of the pole width.

After the top yoke is deposited, the bilayer photoresist is lifted off by a standard procedure. From a top view, the top yoke has a front side that is parallel to the first plane at a distance NH from the first plane. There are two sides that flare outward from the front side and two sides that connect the flared sides to a back side in a back end region. The two sides and back side of the top yoke are essentially overlaid on the two sides and back side, respectively, of the main pole layer.

A second insulation layer which is the write gap layer is deposited on the top yoke, pole tip region, and first insulation layer. An opening in the second insulation layer is made over a portion of the back end region in the top yoke to form a connection area that will enable a subsequently formed first write shield to make contact with the top yoke. A first write shield is formed by selective plating and a portion thereof covers the connection area and the write gap layer along the first plane and extends a distance NH from the first plane over the pole tip region. Once a photoresist layer and underlying seed layer used for the selective plating are removed, a third insulation layer is deposited to fill the opening vacated by stripping the photoresist layer. The third insulation layer and first write shield are planarized simultaneously. The write head is completed by building a second write shield above the first write shield and a coil layer above the third insulation layer followed by forming a photoresist insulation layer to insulate the coils, depositing a fourth insulation layer on the coil layer and forming a third write shield on the second write shield and over the fourth insulation layer.

BRIEF DESCRIPTION OF THE DRAWINGS

FIG. 1 is a cross-sectional view showing a conventional PMR writer which is part of a merged read/write head structure.

FIG. 2 is a top-down view that indicates how NH and pole width dimensions on a main pole layer are trimmed in a conventional ion milling process.

DETAILED DESCRIPTION OF THE INVENTION

The present invention is a PMR write head for use with magnetic storage media in a disk drive and features a top yoke that is formed on a main pole layer and has a tapered edge which partially covers a pole tip region near the ABS. The present invention is also a method for independently forming neck height (NH) and pole width dimensions in a main pole layer of a PMR write head that leads to improved process control for NH and track width. The drawings are provided by way of example and are not intended to limit the scope of the invention. Moreover, the elements in the figures are not necessarily drawn to scale and may have different relative sizes in an actual device.

Figure 3:
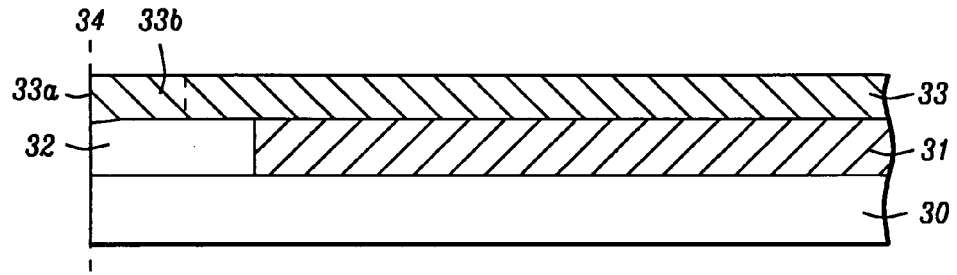
FIG. 3 is a cross-sectional view of a partially formed PMR write head in which a main pole layer is formed on a bottom yoke layer that is recessed from an ABS according to a method of the present invention.

Referring to FIG. 3, a substrate 30 is shown that may be an $Al_2O_3$ layer which serves as a separation layer in a merged read-write head. It is understood that the substrate may be part of a slider (not shown) formed in an array of sliders on a wafer that is subsequently sliced to form rows of sliders. Each row is typically lapped to afford an air bearing surface (ABS) before dicing to fabricate individual sliders that are used in a magnetic recording device.

A bottom yoke 31 comprised of a magnetic material such as CoNiFe or CoFeN is formed on the substrate 30 by a conventional method. For instance, a seed layer and a photoresist layer (not shown) may be sequentially formed on the substrate. The photoresist is patterned to afford an opening in which the bottom yoke layer 31 is thereafter deposited by an electroplating method or the like. The bottom yoke 31 has a thickness of about 0.5 to 1 microns and is recessed about 1 micron from a first plane 34-34 that will subsequently become the ABS. The photoresist is stripped and exposed portions of the seed layer are then removed by an etch process.

A first insulation layer 32 is deposited on the substrate and bottom yoke 31 by a physical vapor deposition (PVD) or chemical vapor deposition (CVD) method. The first insulation layer 32 may be an $Al_2O_3$ layer which is planarized by a chemical mechanical polish (CMP) technique, for example, to be coplanar with the bottom yoke 31.

A main pole layer 33 is now fabricated on the bottom yoke 31 and first insulation layer 32. A similar sequence of seed layer deposition, photoresist patterning, and electroplating as described for the bottom yoke 31 may be followed to form the main pole layer 33 which is preferably comprised of the same magnetic material as in the bottom yoke. The main pole layer 33 with a plated thickness of about 0.6 to 0.8 microns has a pole tip region 33b that terminates in a pole tip 33a at the first plane 34-34. An ion milling step may be performed to trim the initial width of the pole tip 33a and pole Up region 33b by 0.20 to 0.25 microns to an acceptable track width. Unlike a method previously practiced by the inventors, this ion milling step is not used to define the final NH dimension since the pole tip region 33b has been lengthened compared to the pole tip region 10b in FIG. 2. Moreover, the NH dimension in the present invention will be defined by placement of a top yoke as explained in a later section. The main pole layer 33 is polished by a CMP step to a flat surface and a thickness of 0.2 to 0.4 microns after the photoresist and underlying seed layers (not shown) are removed.

Figure 4:
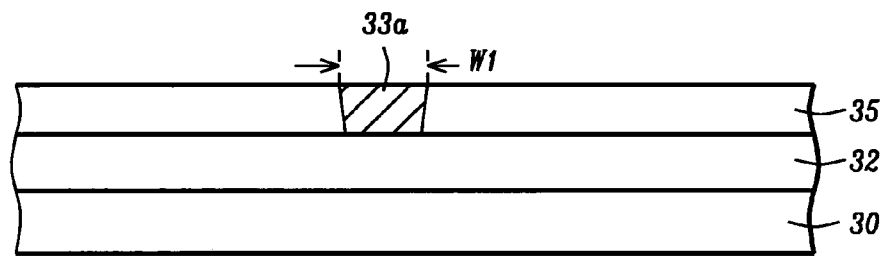
FIG. 4 is a cross-sectional view from the ABS in FIG. 3 after a second insulation layer is formed on the first insulation layer and main pole layer and is planarized to be coplanar with the main pole layer.

Referring to FIG. 4, a cross-sectional view of the partially formed PMR write head in FIG. 3 is depicted from the first plane 34-34 after a second insulation layer 35 which is preferably $Al_2O_3$ is deposited by a CVD or PVD step on the first insulation layer 32. The second insulation layer 35 is shown to be coplanar with the top of the main pole layer 33 including the pole tip 33a after a planarization step. The width $w_1$ which is about 0.11 to 0.16 microns at the top of the pole tip 33a is usually the result of trimming by an ion milling step as mentioned previously. Note that the sidewalls of the pole tip 33a (and pole tip region 33b) are generally sloped and have a width less than $w_1$ at the bottom surface formed on the first insulation layer 32.

Figure 5:
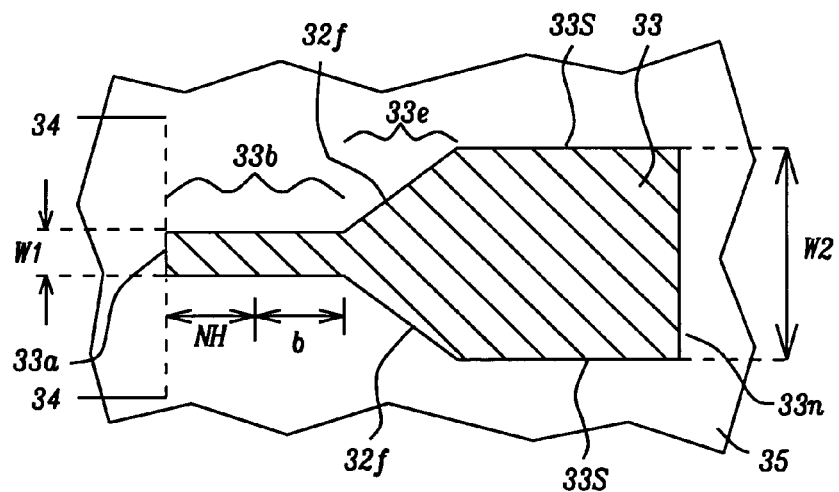
FIG. 5 is a top view of the main pole layer in FIG. 4 that shows a pole tip region and a back end region according to the present invention.

Referring to FIG. 5, a top view of the structure in FIG. 4 is pictured. The pole tip region 33b has a length (NH+b) between the first plane 34-34 and the front end 33e of the back side region in the main pole layer 33. The front end 33e is defined as the region of the main pole layer between the flared sides 33f. NH in the pole tip region 33a is the intended neck height to be defined in a later step. One important feature is that the length (NH+b) of the pole tip region 33b is a relatively long distance compared with the length of the pole tip region in FIG. 2. For example, (NH+b) may be on the order of 0.2 to 0.6 microns while the length of the pole tip region in FIG. 2 prior to ion milling is 0 to about 0.4 microns. Unlike the PMR write head depicted in FIG. 2, NH is represented by a portion of the pole tip region 33b that is not adjacent to the front end 33e of the main pole layer 33. In one embodiment, NH is from about 0.1 to 0.3 microns and b is about 0.1 to 0.3 microns. The back end of the main pole layer 33 is bounded by the front end 33e, the sides 33s, and the back side 33n that has a width $w_2$ which is typically about 8 to 15 microns. The sides 33s are aligned perpendicular to the first plane 34-34 while the back side 33n is parallel to the first plane.

Figure 6:
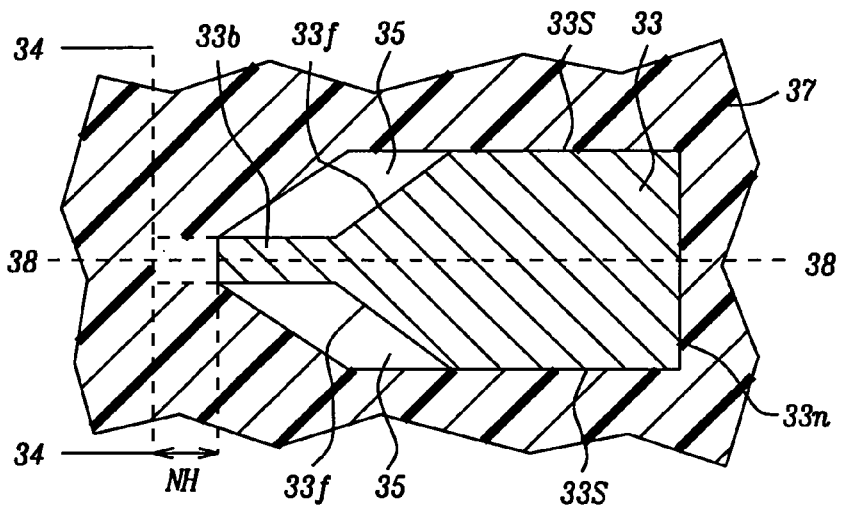
FIG. 6 is a top view of the main pole layer which has a portion of the pole tip region covered by a patterned bilayer resist according to the present invention.
Figure 7:
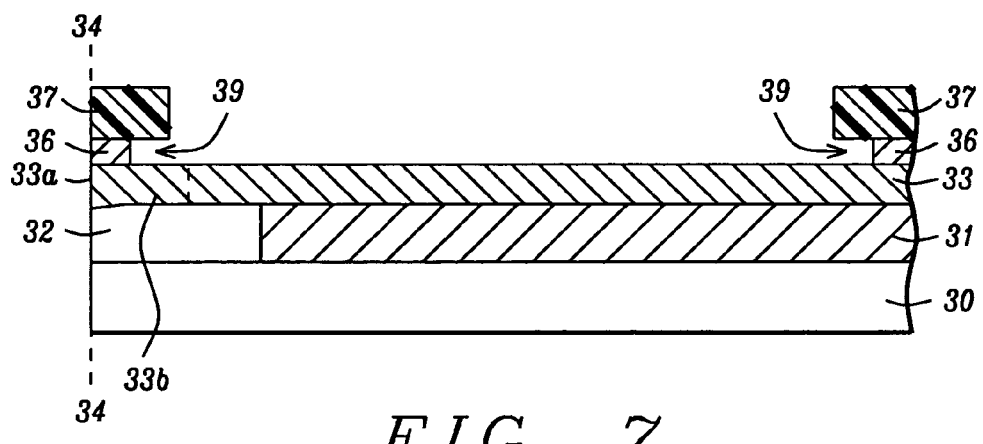
FIG. 7 is a cross-sectional view of the PMR write head in FIG. 6 that has a patterned bilayer resist over a portion of the pole tip region.

Referring to FIG. 6, an important step is depicted in which a bilayer resist is patterned on the second insulation layer 35 and main pole layer 33. In a preferred embodiment, the bilayer resist has a bottom layer 36 (not shown) comprised of PMGI which is a pre-exposed version of poly(methylglutarimide) and an upper layer 37 which is formed from a PFI-88 photoresist. The terms "resist" and "photoresist" are used interchangeably herein. A photo tool and photomask that involve i-line (365 nm) or Deep UV radiation (254 nm) are preferably used for the patterning process. A PMGI formulation is commercially available as the trade name LOL3A from Micro-Chem Company and PFI-88 is an i-line photoresist made by Sumitomo Chemical Company LTD. The patterning process involves spin coating a PMGI formulation and baking at a temperature of about 180° C. for 8 minutes to afford a PMGI bottom layer 36 with a thickness from about 0.25 to 0.4 microns and preferably 0.3 microns on the second insulation layer 35 and main pole layer 33. Thereafter, the PFI-88 formulation is spin coated on the PMGI bottom layer 36 and baked to give a PFI-88 upper layer 37 with a thickness of about 0.6 to 1.2 and preferably 1.0 microns. The PFI-88 upper layer 37 is exposed and developed by an aqueous base solution to form an opening that uncovers the underlying PMGI bottom layer 36. Since the PMGI bottom layer 36 is a pre-exposed material, the same aqueous base developer that removed exposed portions of the PFI-88 upper layer 37 also removes portions of the PMGI bottom layer 36 that were uncovered during the first part of the development process. Furthermore, a slight undercut on the bilayer resist profile is produced as shown in FIG. 7 because the PMGI bottom layer 36 has a uniform dissolution rate throughout unlike the PFI-88 upper layer that has a much higher dissolution rate in exposed regions. Alternatively, another i-line resist or a Deep UV resist could be employed as the upper layer 37 in the bilayer stack.

As a result of the PFI-88 exposure and subsequent development process as depicted in FIG. 6, essentially the entire main pole layer 33 is uncovered except for a portion of the pole tip region 33b with a length NH near the first plane 34-34. Additionally, the second insulation layer 35 is uncovered in a region adjacent to the flared sides 33f and adjacent to the uncovered portion of the pole tip region 33b. The sides 33s and end 33n of the main pole layer 33 may remain covered by the PMGI bottom layer 36 or can be uncovered during the development process.

Referring to FIG. 7, a cross-sectional view of the partially formed PMR write head is depicted from the plane 38-38 in FIG. 6. As mentioned previously, the pre-exposed condition of the PMGI bottom layer 36 allows an undercut 39 to form on the underside of the PFI-88 upper layer 37 during the aqueous base development process. The PMGI bottom layer 36 is advantageously recessed below the PFI-88 upper layer 37 to facilitate a lift-off process in a subsequent step.

Figure 8:
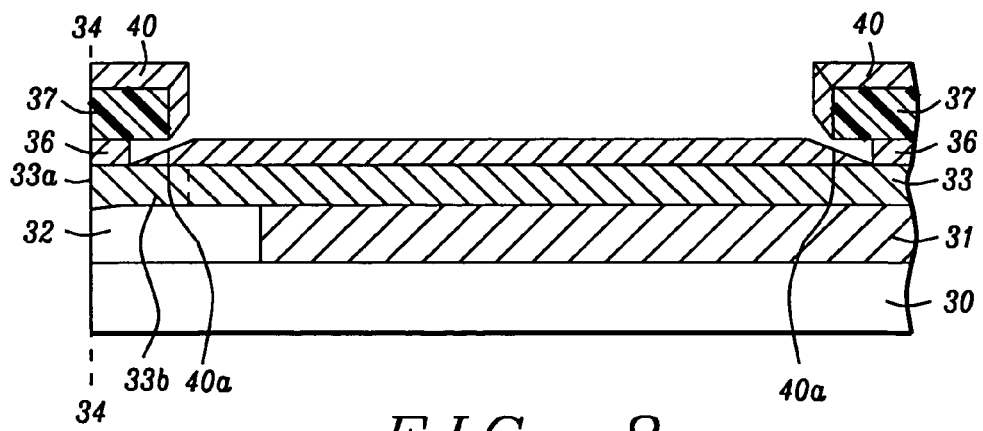
FIG. 8 is a cross-sectional view of the PMR write head in FIG. 7 after a top yoke is deposited within the bilayer resist pattern according to the present invention.

Referring to FIG. 8, another key feature of the present invention is that a top yoke 40 which is preferably comprised of CoFeN is deposited by a sputtering or ion beam deposition (IBD) method on the main pole layer 33 and PFI-88 top layer 37. In one embodiment, the top yoke 40 has a composition represented by $Co_rFe_sN_t$ where r is from 4 to 5 atomic %, s is from 28 to 29 atomic %, and t is from 66 to 67 atomic % and r+S+t=100%. The top yoke 40 has a thickness of about 0.15 to 0.3 microns and preferably 0.2 microns. In one aspect, the ratio of the top yoke 40 thickness to the thickness of the main pole layer 33 is from about 0.8:1 to 1.2:1. The overall thickness of the main pole layer and top yoke are important because if the overall thickness is too thin, the magnetic flux is not strong enough for a write operation while if the overall thickness is too thick, a high magnetic flux close to the ABS can cause an erasure problem on adjacent tracks.

Because of the undercut on the PFI-88 top layer 37, the edge 40a of the top yoke 40 has a sloped profile wherein the thickness of the top yoke gradually decreases to zero as the edge approaches the PMGI bottom layer 36. Thus, the magnetic flux generated in the top yoke 40 and main pole layer 33 by applying a current in a subsequently formed coil layer will be channeled into the pole tip 33a during a write operation.

Preferably, the top yoke 40 and main pole layer 33 are made of the same material which has a high saturation magnetic moment $M_s$ of at least 20 kG. In one embodiment, the top yoke 40, main pole layer 33, and bottom yoke 31 are all comprised of CoFeN. Alternatively, the top yoke, main pole layer, and bottom yoke may be comprised of CoNiFe. By constructing a top yoke and main pole layer of the same high $M_s$ material, it is believed that a stronger writing performance (higher flux field) is achieved compared to a configuration where either the main pole layer or the tapered top yoke is comprised of a low $M_s$ material as found in prior art.

Figure 9:
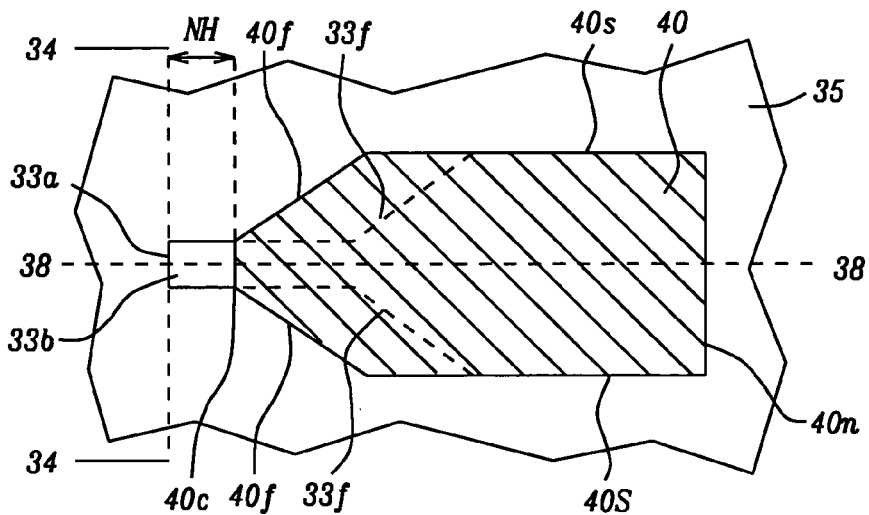
FIG. 9 is a top view of the structure in FIG. 8 showing how the top yoke overlays on the main pole layer after the bilayer resist has been removed.

Referring to FIG. 9, a top view of the partially formed PMR write head is shown after the bilayer resist and overlying top yoke layer 40 are removed by a lift off process known to those skilled in the art. For example, a more concentrated form of the aqueous base solution used to develop the PMGI bottom layer 36 during a previous patterning step may be applied to the substrate 30 to perform the lift-off step. In this case, the aqueous base solution dissolves the remaining PMGI bottom layer 36 and thereby releases the PFI-88 upper layer 37 and the overlying top yoke layer 40. This step completes the bilayer patterning, top yoke deposition, and bilayer removal sequence that defines the NH dimension in the pole tip region 33a. Note that the top yoke 40 covers a portion of the second insulation layer 35 adjacent to the pole tip region 33b and flared sides 33f of the main pole layer 33. The top yoke has a front side 40c overlaid on the pole tip region 33b and two flared sides 40f that extend away from the first plane 34-34. A front end region of the top yoke is defined as the region between the flared sides 40f. In one embodiment, the top yoke 40 has flared sides 40f that are essentially parallel to the flared sides 33f of the main pole layer 33. Furthermore, the top yoke has a back side 40n that is connected to the flared sides 40f by the two sides 40s. The back end region of the top yoke is located between the sides 40s. In one aspect, the sides 40s and back side 40n are essentially overlaid on the sides 33f and back side 33n, respectively, of the main pole layer 33.

Figure 10:
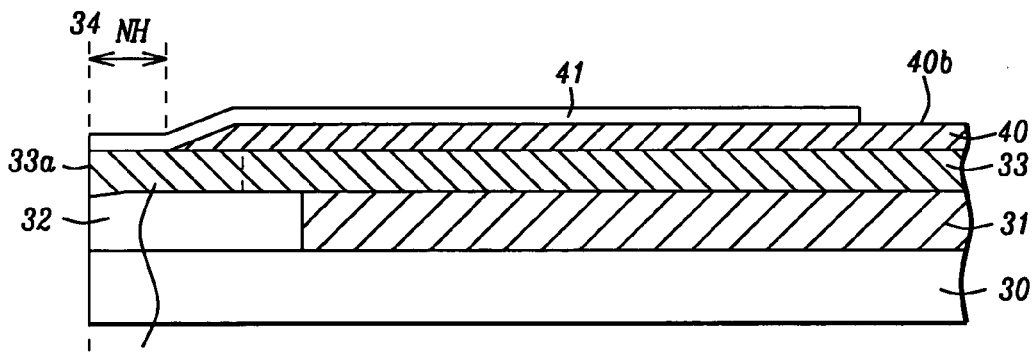
FIG. 10 is a cross-sectional view of the structure in FIG. 9 after a write gap layer is formed on the pole tip region and top yoke layer.

Referring to FIG. 10, a cross-sectional view of the structure in FIG. 9 from the plane 38-38 is shown after a write gap layer 41 is deposited by a sputtering process or the like on the top yoke 40, pole tip region 33b, and second insulation layer 35 (not shown). The write gap layer 41 may be an $Al_2O_3$ layer with a thickness of about 500 to 1000 Angstroms and preferably 800 Angstroms. Typically, the write gap layer 41 conforms to the surface of the layers on which it is deposited. Next, a photoresist layer (not shown) is patterned on the write gap layer and an ion beam etch (IBE) is employed to expose the top surface 40b of the top yoke 40 in a so-called connection area within the back end region of the top yoke layer. Thereafter, the photoresist layer is stripped by a conventional method.

Figure 11:
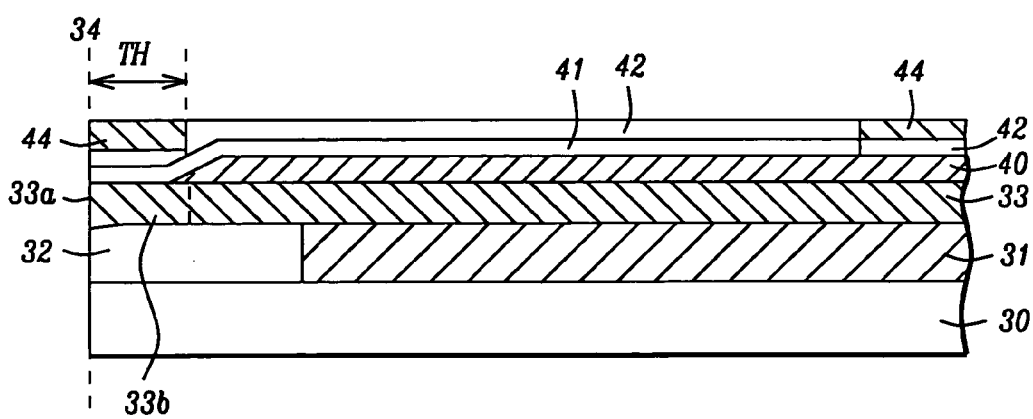
FIG. 11 is a cross-sectional view of the structure in FIG. 10 after forming a first write shield on a seed layer and an insulation layer on the write gap layer according to the present invention.

Referring to FIG. 11, a seed layer 42 such as CoFeNi is deposited on the write gap layer 41 and on the top surface 40b of the connection area. A photoresist layer 43 is patterned on the seed layer 42 to form an opening above the top surface 40b of the top yoke in the connection area and an opening that extends a distance TH of about 0.1 to 0.5 microns from the first plane 34-34 toward the back side of the top yoke layer 40. The seed layer 42 is uncovered at the bottom of the openings. Next, a selective electroplating process is performed as is understood by those skilled in the art which deposits the first write shield 44 on the exposed seed layer 42 in the openings. The first write shield 44 has a thickness of about 1.5 to 2.0 microns and is preferably CoNiFe.

Figure 12:
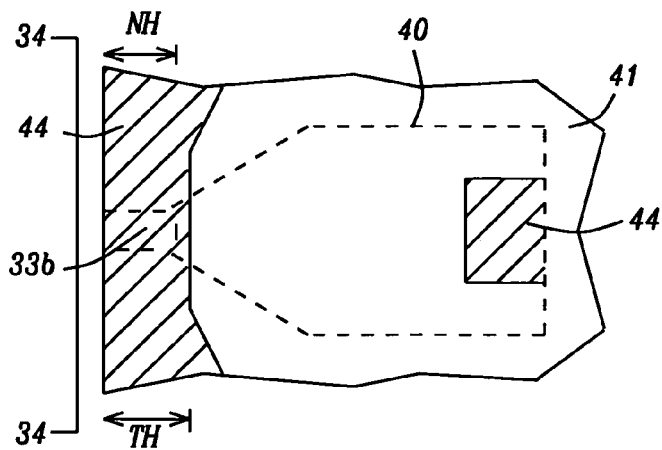
FIG. 12 is a top view showing how the first write shield overlays on the top yoke layer and write gap layer

Referring to FIG. 12, a top view of the partially formed write head is depicted after the photoresist layer 43 is removed by a standard stripping method and the seed layer 42 uncovered by the photoresist strip is removed by an ion beam etch method known to those skilled in the art. The first write shield 44 has a front portion formed along the first plane 34-34 and a back portion disposed over the connection area on the top yoke. The pole tip region 33b and top yoke 40 within the dashed lines are covered by the write gap layer 41 in regions not covered by the first write shield.

Figure 13:
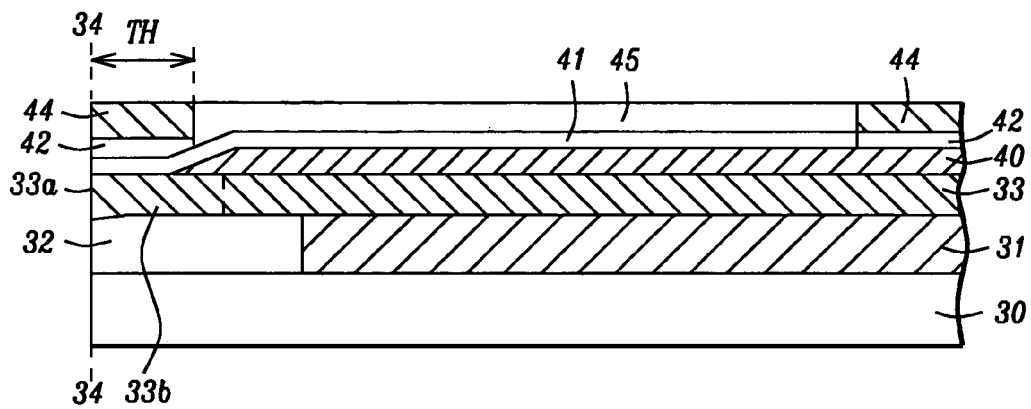
FIGS. 13 and 14 are cross-sectional views showing steps for completing the PMR write head of the present invention by adding second and third write shields.

In FIG. 13, a cross-sectional view of the partially formed write head shows a third insulation layer 45 that is deposited by a CVD or PVD method to fill the opening vacated by the photoresist layer and seed layer. The third insulation layer 45 may be comprised of $Al_2O_3$. The third insulation layer 45 and first write shield 44 become coplanar after a planarization step such as a CMP process which reduces the first write shield thickness to about 0.5 microns.

Figure 14:
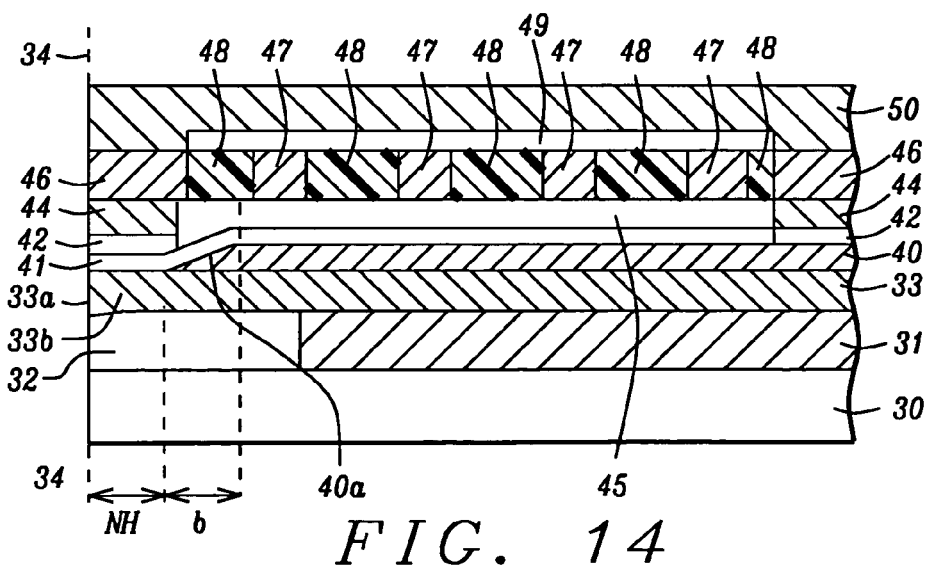

Referring to FIG. 14, the PMR write head is completed by a well known sequence of steps of which the details are not described herein. In one embodiment, a second write shield 46 with a thickness of about 2 to 3 microns is formed on the first write shield 44 along the first plane 34-34 (ABS) and over the connection area at the back end of the write head. A front portion of the second write shield 46 along the first plane 34-34 has a small overlap of about 0.4 microns on the third insulation layer 45. Above the third insulation layer 45 not covered by the second write shield 46 is formed a coil layer 47 that typically has a spiral shape and is wrapped around the second write shield on the back side of the main pole layer 33. The coil layer 47 has a thickness from about 2 to 3 microns and is coplanar with the second write shield 46. Between the coils in the coil layer 47 is a photoresist layer 48 that serves as an insulation layer. A fourth insulation layer (not shown) which is a 3 to 4 micron thick $Al_2O_3$ layer is deposited on the third insulation layer 45, second write shield 46, coil layer 47, and photoresist layer 48 and is planarized by a CMP process until coplanar with the second write shield 46. Following the planarization step, a fifth insulation layer 49 comprised of $Al_2O_3$ with a thickness of about 0.2 microns is formed on the coil layer 47 and photoresist layer 48, and fourth insulation layer. A third write shield 50 having a thickness of 2 to 3 microns is then formed on the fifth insulation layer 49 and on the second write shield 46. Although not shown in the drawing, the third write shield 50 typically extends beyond the second write shield 46 toward the back end of the write head Referring to FIG. 15, a cross-sectional view from the first plane 34-34 depicts the configuration in which a write gap layer 41, seed layer 42, first write shield 44, second write shield 46, and third write shield 50 are sequentially formed above the pole tip 33a.

Figure 16:
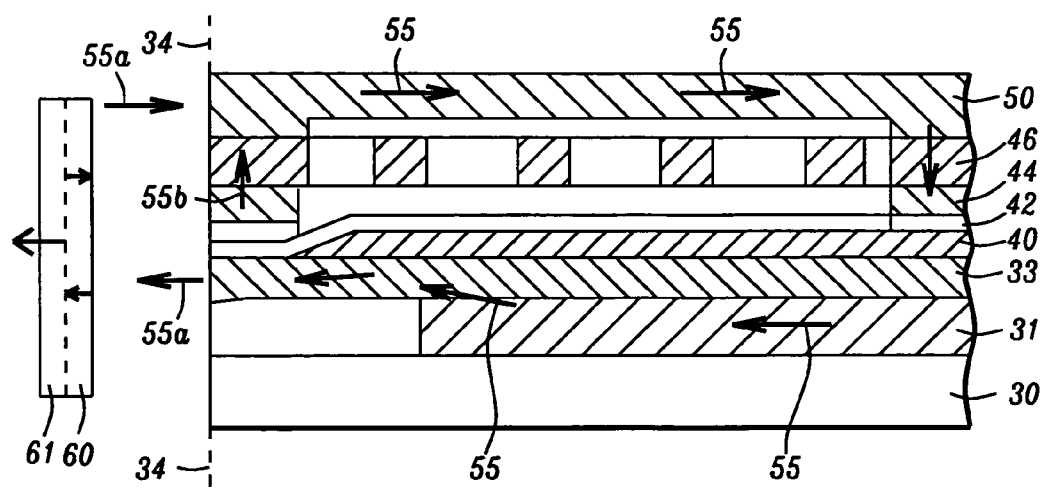
FIG. 16 is a cross-sectional view showing the magnetic flux path in the PMR write head of the present invention.

In FIG. 16, the magnetic flux path of the PMR write head of the present invention is illustrated. Only the magnetic layers and first plane 34-34 (ABS) are numbered to simply the drawing and direct attention to the magnetic flux direction. Note that the flux return pole is essentially comprised of the first write shield 44, second write shield 46, and third write shield 50. A magnetic flux 55 generated by flowing a current through the coil layer described previously passes through the bottom yoke 31, main pole layer 33, and top yoke 40 before a first flux field 55a exits the main pole layer through the pole tip 33a and enters a recording layer 60 and a soft underlayer 61. A second flux field 55b passes from the main pole layer 33 to the first write shield and then the second write shield before entering the third write shield 50. Meanwhile, the first flux field enters the third write shield 50 after exiting the recording layer 60. The magnetic flux path in the third write shield leads to the back of the PMR write head 70 where the magnetic flux 55 transits the second write shield 46 and first write shield 44 (and seed layer 42) in the connection area to reach the top yoke 41, main pole layer 33, and bottom yoke 31 once again.

A significant advantage of the present invention is that the NH and pole width dimensions in the PMR write head are determined in separate steps which enables better process control in fabricating the pole tip region. Since the yoke can be formed a greater distance from the ABS than in conventional PMR write heads, the ion milling step which defines the pole width has a higher degree of control. Furthermore, the bilayer patterning and top yoke deposition steps allow greater accuracy in defining the neck height than a conventional ion milling process.

Figure 15:
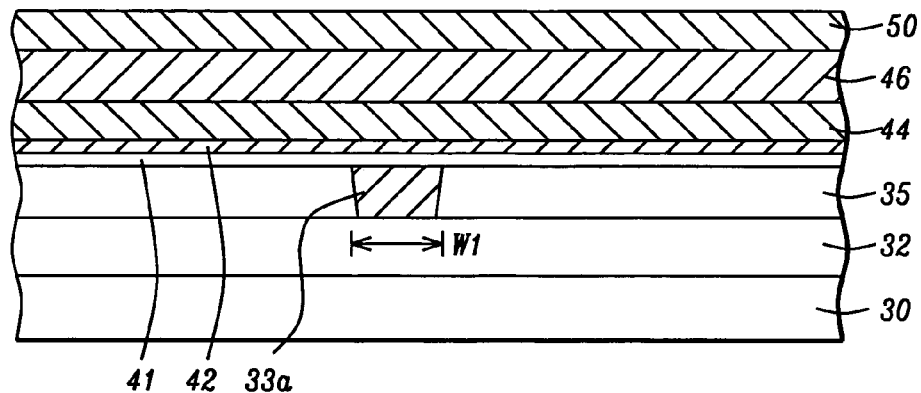
FIG. 15 is a cross-sectional view from the ABS of the PMR writer in FIG. 14.

The present invention is also the PMR write head depicted in FIGS. 14-16 that is fabricated by the previously described method of independently forming NH and pole width dimensions in a main pole layer. As illustrated in FIG. 14, there is a substrate 30 that may be an $Al_2O_3$ separation layer in a merged read-write head upon which a bottom yoke 31 with a thickness of about 1.0 microns is formed. The bottom yoke 31 is coplanar with a first insulation layer 32 comprised of $Al_2O_3$ that separates the bottom yoke from a first plane 34-34 which in this case is an ABS. The bottom yoke 31 is preferably comprised of CoNiFe or CoFeN and is recessed from the first plane 3434 by a distance of about 1 micron.

A main pole layer 33 is formed on the bottom yoke 31 and first insulation layer 32 and has a uniform thickness of about 0.2 to 0.4 microns. The main pole layer 33 has a pole tip region 33b that extends a distance NH+b perpendicular to the first plane 34-34 where NH is the neck height of about 0.1 to 0.3 microns and b is a length of about 0.1 to 0.3 microns. One end of the pole tip region 33b at the ABS is the pole tip 33a. The main pole layer 33 is coplanar with a second insulation layer (not shown) disposed on the first insulation layer 32. The main pole layer 33 and bottom yoke 31 may be comprised of the same high $M_s$ magnetic material such as CoNiFe or CoFeN.

A top view of the main pole layer 33 with overlying layers removed in FIG. 5 shows sides 33f that flare out from a front side adjacent to the pole tip region 33b and which define a front end 33e. The back end region of the main pole layer 33 has two sides 33s that are aligned perpendicular to the first plane 34-34 and which connect the flared sides 33f to a back side 33n that is located a distance of about 13 microns from the first plane 34-34. The second insulation layer 35 is made of $Al_2O_3$ and is shown surrounding the main pole layer.

A key feature is that a top yoke 40 is formed on the main pole layer 33 and second insulation layer 35. From a top-down perspective of the top yoke 40 in FIG. 9 in which overlying layers have been removed, the top yoke 40 has a front side 40a that is overlaid on the pole tip region 33b at an NH distance from the first plane 34-34. Two sides 40f flare outward (away from the plane 34-34) and define a front end region of the top yoke. The back end region of the top yoke 40 has a back side 40n that is connected to the flared sides 40f by the two sides 40s. In one embodiment, the sides 40s, 40n are essentially overlaid on the sides 33s, 33n (not shown), respectively, of the main pole layer 33 and the flared sides 40f are parallel to the flared sides 33f of the main pole layer.

In one embodiment, the top yoke 40 is comprised of CoFeN and has a thickness of 0.15 to 0.3 microns and preferably 0.2 microns. Preferably, the top yoke, main pole layer 33, and bottom yoke 31 are comprised of the same magnetic material which has a high Ms value of at least 20 kG. Optionally, the top yoke 40 and main pole layer 33 are made of CoFeN and the bottom yoke 31 is comprised of CoNiFe. The relative thickness of the top yoke and main pole layer is important and preferably the thickness ratio of the top yoke 40 to main pole layer 33 is from 0.8:1 to 1.2:1. Note that the top yoke has a tapered edge 40a as explained previously which is above the pole tip region 33b and above the sides 33f, 33s, 33n (not shown) of the main pole layer Returning to FIG. 14, a conformal write gap layer 41 is disposed on the top yoke 40, pole tip region 33b, and second insulation layer 35. A portion of the back end region of the top yoke 40 which serves as a connection area to a first write shield 44 is not covered by the write gap layer 41. There is a seed layer 42 which may be CoNiFe that extends a distance NH from the ABS toward the back end region on the write gap layer 41. The seed layer 42 also covers the aforementioned connection area. As shown in FIG. 12, the first write shield 44 which is comprised of CoNiFe with a thickness of about 0.5 microns has a front portion on the seed layer 42 along the ABS and a back portion on the connection area.

Referring to FIG. 14, there is a third insulation layer 45 that may be an $Al_2O_3$ layer which is coplanar with the first write shield 44 and is formed on the write gap layer 41 not covered by the first write shield. A second write shield 46 is formed on the first write shield 44 and has a thickness of about 2 to 3 microns and the same composition as the first write shield. A front portion of the second write shield along the plane 34-34 extends a TH distance (greater than NH) toward the back end of the write head and slightly overlaps the third insulation layer 45 by about 0.4 microns. Above the third insulation layer 45 is a coil layer 47 comprised of Cu that is coplanar with the second write shield 46. Between the coils in the coil layer 47 and adjacent to the second write shield 46 is formed a photoresist layer 48 that serves as an insulator material. The photoresist layer 48 is coplanar with the coil layer. There is a fourth insulation layer (not shown) formed adjacent to and coplanar with the second write shield and a fifth insulation layer 49 with a thickness of about 0.2 microns that covers the coil layer 47, photoresist layer 48, and fourth insulation layer The fourth insulation layer and fifth insulation layer 49 may be comprised of $Al_2O_3$. The top layer in the PMR write head of the present invention is a third write shield 50 that is disposed on the second write shield 46, fourth insulation layer, and fifth insulation layer 49. The third write shield is comprised of CoNiFe and has a thickness between 2 and 3 microns.

Referring to FIG. 15, the PMR write head of the present invention is an improvement over prior art PMR write heads since the track width $w_1$ is formed within a tighter specification. This result is achieved because the pole tip region having a neck height NH (FIG. 14) is separated from the front end of the main pole layer by a substantially larger distance b than in conventional write heads that prevents an ion milling process used to trim the main pole layer from causing large NH variations. Furthermore, the NH dimension is formed more reproducibly from slider to slider because of the bilayer photoresist process employed to form the top yoke. It is understood by those skilled in the art that a subsequent lapping process is typically used to adjust NH. However, the improved NH and pole width control afforded by the method of the present invention is carried through the lapping process and in effect makes the lapping process itself easier to control.

While this invention has been particularly shown and described with reference to, the preferred embodiment thereof, it will be understood by those skilled in the art that various changes in form and details may be made without departing from the spirit and scope of this invention.

We claim:

1. A method for independently forming neck height and pole width dimensions in a main pole layer of a PMR write head, comprising:
   (a) forming a main pole layer comprised of a high saturation magnetic moment (Ms) material on a substrate wherein the main pole layer has a first thickness and is comprised of a pole tip region that has a first width, two ends, and two sides in which a first end is a pole tip formed along a first plane that is perpendicular to said substrate and a second end is formed a certain distance from the pole tip and is adjacent to a front side of a front end region of the main pole layer;
   (b) trimming the first width to form a pole width dimension;
   (c) forming a top yoke comprised of a high Ms material with a second thickness and a tapered edge on said main pole layer that partially overlaps said pole tip region in which a front portion including said pole tip which is not covered by said top yoke has a first length that is the neck height dimension and a back portion adjacent to said front end region is covered by the top yoke and has a second length wherein the combined first and second lengths are equal to said certain distance.

2. The method of claim 1 wherein said substrate is comprised of a bottom yoke that is recessed about 1.0 microns from said first plane.

3. The method of claim 1 wherein the main pole layer is comprised of CoFeN and has a first thickness which is between about 0.2 and 0.4 microns.

4. The method of claim 1 wherein the first width is trimmed by an ion milling process to a pole width dimension of about 0.11 to 0.16 microns.

5. The method of claim 1 wherein the top yoke is comprised of CoFeN with a second thickness of about 0.15 to 0.3 microns.

6. The method of claim 1 wherein the ratio of the second thickness to the first thickness is between 0.8:1 and 1.2:1.

7. The method of claim 1 wherein the first length of the front portion of said pole tip region is about 0.1 to 0.3 microns.

8. The method of claim 1 wherein the second length of the back portion of said pole tip region is about 0.1 to 0.3 microns.

9. The method of claim 1 wherein step (c) is comprised of:
   (a) forming a bottom layer of a bilayer resist on said main pole layer;
   (b) forming a top layer of said bilayer resist on said bottom layer;
   (c) forming a pattern in said bilayer resist that has an undercut profile and uncovers essentially all of the main pole layer except for the front portion of the pole tip region adjacent to said first plane;
   (d) depositing the top yoke; and
   (e) removing said bilayer resist with a lift-off process.

10. The method of claim 9 wherein the bottom layer is comprised of pre-exposed poly(methylglutarimide) with a thickness of about 0.3 microns and said top layer has a thickness of about 1 micron and is formed from PFI-88 resist or another i-line or Deep UV resist.

11. A method for forming a PMR write head, comprising:
   (a) forming a bottom yoke within a first insulation layer on a substrate;
   (b) forming a main pole layer on said bottom yoke and coplanar with a second insulation layer formed on the first insulation layer wherein the main pole layer has a first thickness and is comprised of a pole tip region that has a first width, two ends, and two sides in which a first end is a pole tip formed along a first plane that is perpendicular to said substrate;
   (c) trimming the first width to form a pole width dimension;
   (d) forming a top yoke with a second thickness and a tapered edge on said main pole layer that partially overlaps said pole tip region to define a neck height dimension in the pole tip region between the tapered edge and the first plane;
   (e) forming a write gap layer on said pole tip region that covers the top yoke except for a portion of a back end region that serves as a connection area;
   (f) forming a first write shield on the connection area and on the write gap layer along the first plane; and
   (g) forming a second write shield on the first write shield, and a third write shield on the second write shield.

12. The method of claim 11 wherein the bottom yoke is comprised of CoNiFe or CoFeN with a thickness of about 0.5 to 1.0 microns and is separated from the first plane by the first insulation layer.

13. The method of claim 11 wherein the main pole layer is comprised of CoNiFe or CoFeN and has a first thickness of from 0.2 to 0.4 microns.

14. The method of claim 11 wherein the trimming step involves an ion milling process that forms a pole width dimension of about 0.11 to 0.16 microns.

15. The method of claim 11 wherein the top yoke is comprised of CoNiFe or CoFeN and has a second thickness between about 0.15 and 0.3 microns.

16. The method of claim 15 wherein the top yoke has a composition represented by $Co_rFe_sN_t$ where r is from 4 to 5 atomic %, s is from 28 to 29 atomic %, and t is from 66 to 67 atomic % and r+s+t=100%.

17. The method of claim 11 wherein the top yoke overlaps a back portion of said pole tip region that has a second length of about 0.1 to 0.3 microns and does not overlap a front portion with a first length of about 0.1 to 0.3 microns adjacent to the first plane wherein the first length is the neck height dimension.

18. The method of claim 11 wherein the write gap layer is comprised of $Al_2O_3$ and has a thickness of about 0.05 to 0.1 microns.

19. The method of claim 11 wherein the first write shield has a thickness of about 0.5 microns and is comprised of CoNiFe.

20. The method of claim 11 wherein the second write shield and third write shield each have a thickness of about 2 to 3 microns and are comprised of CoNiFe.

21. The method of claim 11 wherein the ratio of said second thickness to said first thickness is between about 0.8:1 to 1.2:1.

22. The method of claim 11 wherein step (d) is performed by
   (a) forming a bottom layer of a bilayer resist on said main pole layer;
   (b) forming a top layer of said bilayer resist on said bottom layer;
   (c) forming a pattern in said bilayer resist that has an undercut profile and uncovers essentially all of the main pole layer except for the front portion of the pole tip region adjacent to said first plane;
   (d) depositing said top yoke; and
   (e) removing said bilayer resist with a lift-off process.

23. The method of claim 22 wherein the bottom layer is comprised of poly(methylglutarimide) with a thickness of about 0.3 microns and said top layer has a thickness of about 1 micron and is formed from PFI-88 resist or another i-line or Deep UV resist.

24. The method of claim 11 further comprised of forming a seed layer between said write gap layer and said first write shield and between the connection area of the top yoke and the first write shield.

25. The method of claim 11 wherein said substrate is comprised of an $Al_2O_3$ separation layer that is formed on a read head.

26. A PMR write head, comprising:
  (a) a bottom yoke formed within a first insulation layer on a substrate;
  (b) a main pole layer formed of a high Ms material on said bottom yoke and coplanar with a second insulation layer disposed on the first insulation layer wherein the main pole layer has a first thickness and is comprised of a pole tip region that extends a certain distance from a front end of the main pole layer and terminates at a pole tip having a pole width along a first plane which is an ABS that is perpendicular to said substrate; and
  (c) a top yoke which is a high Ms material with a second thickness and a tapered edge formed on said main pole layer, said top yoke covers a back portion with a second length in said pole tip region and does not cover a front portion with a first length wherein said combined first and second lengths equal said certain distance.

27. The PMR write head of claim 26 wherein the substrate is an $Al_2O_3$ separation layer formed on a read head in a merged read-write head structure.

28. The PMR head of claim 26 wherein the bottom yoke is comprised of CoNiFe or CoFeN with a thickness of about 0.5 to 1 microns and is recessed from the first plane by a distance of about 1 micron.

29. The PMR head of claim 26 wherein the main pole layer is comprised of CoNiFe or CoFeN and has a first thickness of about 0.2 to 0.4 microns.

30. The PMR head of claim 26 further comprised of a stack of layers formed above said pole tip along the ABS, said stack is comprised of in order from bottom to top:
  (a) a write gap layer;
  (b) a first write shield with a thickness of about 0.5 microns;
  (c) a second write shield with a thickness of about 2 to 3 microns; and
  (d) a third write shield with a thickness of about 2 to 3 microns.

31. The PMR head of claim 30 wherein the write gap layer is comprised of $Al_2O_3$ and the first, second, and third write shields are comprised of CoNiFe.

32. The PMR head of claim 26 wherein the first length is a neck height dimension which is between about 0.1 and 0.3 microns.

33. The PMR head of claim 26 wherein the top yoke is comprised of CoFeN or CoNiFe and has a thickness of about 0.15 to 0.3 microns.

34. The PMR head of claim 26 wherein the ratio of the second thickness to the first thickness is from about 0.8:1 to 1.2:1.

35. The PMR head of claim 26 wherein the second length in said pole tip region is about 0.1 to 0.3 microns.

36. The PMR head of claim 26 wherein the main pole layer and top yoke each have sides and a back side that define a back end region and the sides and back side of the top yoke are essentially overlaid on the sides and back side, respectively, of the main pole layer.

37. The PMR head of claim 26 wherein the top yoke and main pole layer each have flaired sides that define a front end region and the flaired sides of the top yoke are aligned parallel to the flaired sides of the main pole layer.

* * * * *